Patented Sept. 21, 1954

2,689,850

UNITED STATES PATENT OFFICE 2,689,850

METHOD OF PRODUCING SOLUBLE QUINOLINE SULFONIC ACIDS

Nathaniel Grier, Englewood, N. J., assignor to Dar-Syn Laboratories, Inc., Hawthorne, N. J., a corporation of New Jersey No Drawing. Application April 5, 1952, Serial No. 280,849

12 Claims. (Cl. 260—283)

The present invention is directed to the sulphonation of quinoline and more particularly to a selective sulphonation procedure in order to produce quinoline-5-sulphonic acid in substantially pure state. This application is a continuation-in-part of my copending application Serial No. 116,423, filed September 17, 1949, now abandoned.

A number of processes have been previously used for the sulphonation of quinoline and one such process in use has been to react quinoline with concentrated sulphuric acid such as 10–20% oleum and even 65% oleum. The operation was conducted at various temperatures resulting in the production of quinoline-8-sulphonic acid as the principal product. This product is characterized by being substantially insoluble in dilute sulphuric acid and in water. During such an operation there is also obtained as a by-product of the sulphonation, quinoline-5-sulphonic acid in a minor proportion, and it has been reported that the ratio of the 8-isomer to the 5-isomer is about 3 to 1. It has been heretofore impossible to commercially produce the 5-isomer substantially free from the 8-isomer by previously known procedures of quinoline sulphonation.

It is among the objects of the present invention to sulphonate quinoline selectively under such conditions as to retard or eliminate the formation of quinoline-8-sulphonic acid and to promote the almost complete conversion of the quinoline to quinoline-5-sulphonic acid and other relatively water-soluble sulphonic acids.

It is also among the objects of the present invention to utilize a catalyst in the process which suppresses the formation of the 8-isomer and conversely promotes the formation of the 5-isomer.

It is further among the objects of the present invention to provide a process which is simple and effective, which results in high yields of quinoline-5-sulphonic acid and which is capable of producing said compound in relatively pure form.

The invention is based upon the discovery that mercury and certain compounds thereof have an unusual catalytic effect in the process of sulphonation of quinoline in that it is capable of substantially completely eliminating the formation of quinoline-8-sulphonic acid during the progress of the sulphonation. These catalysts promote the sulphonation of the quinoline to quinoline-5-sulphonic acid although substantial quantities of other quinoline monosulphonic acids soluble in dilute sulphuric acid and water may also in some cases be formed.

Metallic mercury is satisfactory as a catalyst for the operation but it is preferred to use various mercury compounds. Those mercury compounds which are capable of reacting with sulphuric acid or acid sulphates under the conditions present in sulphonation mixtures act catalytically in the present reaction, as well as mercury sulphate. Both organic and inorganic compounds of mercury are suitable. In general, the mercuric compounds are more effective as catalysts and they include the oxides of mercury and certain inorganic salts of mercury. The organic salts are deemed for the present purpose to be more desirable than the inorganic salts and such compounds as mercuric oxalate, mercuric acetate and mercuric salicylate have been found quite suitable. Organic substituted derivatives of mercury such as phenyl mercuric acetate, o-chloromercuriphenol, and diphenyl mercury were also active in promoting the reaction.

Mercurous compounds are also suitable but are not as effective as the mercuric compounds. For instance, mercurous chloride has been found to promote the formation of quinoline-5-sulphonic acid and other soluble quinoline monosulphonic acids at the expense of the 8-isomer. Those mercury compounds which do not react with sulphuric acid, such as mecuric chloride, bromide and iodide, are not suitable as their influence in the reaction is negligible. Mercuric fluoride is effective.

The temperature and other conditions of operation are analogous to the conditions previously used in sulphonation of quinoline without a catalyst to produce quinoline-8-sulphonic acid. The temperature of the reaction is substantially above room temperatures, and depending upon the concentration of the sulphonating reagent and the reaction time, preferably in the neighborhood of 100° to 150° C. or higher. A temperature of 175° to 195° C. has been found to give high yields of the 5-isomer with the complete suppression of the formation of the 8-isomer. The usual sulphonating agents are used in the procedure, preferably sulphuric acid containing an excess of $SO_3$.

The product formed in the present process is quite pure and is entirely free from quinoline-8-sulphonic acid. The quinoline-5-sulphonic acid has been found useful as an intermediate in the manufacture of 5-hydroxy quinoline, which is quite a valuable antioxidant. The product being completely soluble in dilute sulphuric acid may be used with special conditions in certain oxidation processes for the formation of quinolinic and nicotinic acids which have important applications in industry.

The invention is usually carried out using from three to six times the weight of sulphonating agent based on quinoline used. The temperatures and times of reaction are those previously used in sulphonation procedures and the catalyst is preferably used in the amount of 1% to 2% by weight of the quinoline. The following are specific examples of the operation of the invention.

Example I 3.0 gms. mercury were added to 400 cc. 20% oleum. There was then added 175 cc. quinoline at such a rate that the maximum temperature reached was 175° C. The reaction mixture was then maintained at 170° C. for three hours. After cooling to 90° C. the mixture was poured into 2.5 liters $H_2O$. On standing and cooling 24 hours no precipitation occurred. In the absence of mercury a yield of 160–180 gms. of quinoline-8-sulphonic acid would be obtained at this stage.

The dilute sulphuric acid solution was treated with a saturated aqueous solution of mercuric chloride for the isolation of quinoline-5-sulphonic acid according to the method of K. U. Bokil, J. Indian Chemical Society, vol. 13, p. 404 (1936). This method consists in treating an acid solution containing quinoline-5-sulphonic acid with a saturated aqueous solution of mercury bichloride. The addition product of quinoline-5-sulphonic acid and mercury bichloride forms rapidly as an insoluble precipitate. On treatment with hydrogen sulphide in hot water the quinoline-5-sulphonic acid is liberated in solution, and it crystallized upon evaporation of the solution. A yield of 135 gms. of quinoline-5-sulphonic acid was obtained. Treatment of the residual liquors showed the absence of quinolinic and nicotinic acids, possible oxidation products. The remainder of the sulphonation products were water soluble quinoline mono-sulphonic acids.

Example II 3 gms. yellow oxide of mercury were added to 400 cc. 20% oleum and reacted with 175 cc. quinoline as in Example I. No quinoline-8-sulphonic acid was obtained. There were isolated 128 gms. quinoline-5-sulphonic acid.

Example III 1.5 gms. mercuric salicylate were added to 200 cc. 20% oleum and treated with 87.5 cc. quinoline as outlined in Example I. Less than 1 gm. of quinoline-8-sulphonic was obtained, 71 gms. of quinoline-5-sulphonic acid were isolated.

Example IV 2.0 gms. mercuric sulphate were added to 200 cc. 20% oleum and reacted with 87.5 gms. quinoline at 170° C. as previously outlined. No quinoline-8-sulphonic acid resulted. A yield of 67 gms. quinoline-5-sulphonic acid was obtained.

Example V 3.0 gms. phenyl mercuric acetate were added to 400 cc. 20% oleum and reacted at 170° C. with 175 cc. quinoline for 3 hours. Less than 2.0 gms. of quinoline-8-sulphonic acid were obtained. The yield of quinoline-5-sulphonic acid was 134 gms.

Example VI 175 ml. quinoline was reacted with 400 ml. oleum (contains 20% by weight of sulphur trioxide) to which there previously had been added 3.0 g. mercuric fluoride dihydrate. After complete addition of the quinoline the reaction mixture was maintained at 175° C. for a period of five hours. On quenching the mixture in water and cooling not a trace of quinoline-8-sulphonic acid precipitated. The entire sulphonation products consisted of quinoline-5-sulphonic acid and other relatively soluble quinoline monosulphonic acids.

In order to differentiate between any catalytic effects due to the presence of fluoride ions a run was made using 175 ml. quinoline, 400 ml. 20% oleum, and 6.0 gms. calcium fluoride at 175° C. for five hours. On quenching in water and cooling there were obtained by suction filtration and drying a total of 178 grams quinoline-8-sulphonic acid. This yield is equal to that obtained in the absence of calcuim fluoride.

Example VII 175 ml. quinoline, 400 ml. 20% oleum and 3.0 gms. mercuric cyanide were reacted at 175° C. for five hours. It was then cooled, poured into 1600 ml. water, and cooled to room temperature. No precipitation of quinoline-8-sulphonic acid was observed. All of the quinoline was found to be sulphonated; the products were quinoline-5-sulphonic acid and other relatively water soluble quinoline sulphonic acids.

Example VIII

Some compounds of mercury react slowly with sulphuric acid. These products must be used in larger amounts relatively as functioning catalysts. Thus, when 4.0 gms. phenylmercuric chloride were employed with 175 ml. quinoline and 400 ml. 20% oleum, due to the slow and partial reaction with the sulphuric acid only a partial catalytic effect was observed. There was obtained a yield of 83 gms. quinoline-8-sulphonic acid. The amount of phenylmercuric chloride used was then increased to 12.0 gms. In this instance no quinoline-8-sulphonic acid was formed.

Example IX

White precipitate of mercury, $HgNH_2Cl$, reacts similarly to phenylmercuric chloride with sulphuric acid. Using 175 ml. quinoline and 400 ml. 20% oleum with 3.0 g. $HgNH_2Cl$ as above a yield of 83 gms. quinoline-8-sulphonic acid was obtained. On increasing the quantity of white precipitate of mercury to 12.0 gms. only quinoline-5-sulphonic acid and the other relatively water soluble quinoline sulphonic acids formed to the complete exclusion of quinoline-8-sulphonic acid.

Example X

Mercuric nitrate, a compound which reacts readily with sulphuric acid, used in a ratio of 3.0 gms. to 175 ml. quinoline and 400 ml. 20% oleum as above was completely effective in suppressing the formation of quinoline-8-sulphonic acid and promoting the formation of quinoline-5-sulphonic acid along with the other soluble sulphonic acids.

Example XI 2.0 gms. mercuric acetate were added to 300 gms. 65% oleum. To this 87.5 cc. quinoline were added at such a rate that the temperature did not exceed 140° C. The reaction mixture was maintained at 130–140° C. for 1 hour. On cooling and pouring into 800 cc. $H_2O$ the resultant quenched mixture yielded no quinoline-8-sulphonic acid. There were isolated 63 gms. quinoline-5-sulphonic acid.

Example XII

In order to determine the relative amounts of catalyst so as to obtain complete suppression of the formation of the 8-isomer, a series of runs was made without catalysts and with increasing amounts of the catalyst under parallel conditions. In each of the runs 400 cc. of 20% oleum was used. The temperature of the reaction was 170° C. and the time was 3 hours, using 175 cc. of quinoline. The procedure followed that of Example I, and the following results were obtained:

| Mercuric Acetate catalyst | Yield Quinoline-8-Sulphonic Acid |
|---|---|
| Grams | Grams |
| 3 | 0 |
| 2 | 0 |
| 1.5 | 28 |
| 1.0 | 84 |
| 0.5 | 116 |
| 0.4 | 123 |
| 0.0 | 160 |

When the catalyst was used in an amount slightly over 1% based on the quinoline, complete suppression of the 8-isomer was obtained. According to the table, as low as 0.2% of the mercury compound suppressed the formation of the 8-isomer.

*Example XIII*

In order to demonstrate the catalytic effect of the mercury compounds, a test was made under conditions of the prior art as described in the article by G. E. McCashland, in the Journal of Organic Chemistry, vol. II, page 279 (1946). To 123 ml. 30% oleum there were added 1.5 gms. mercuric acetate. The mixture was cooled with an ice bath and 59 cc. quinoline added at such a rate that the temperature did not exceed 90° C. It was held at 90° C. for 40 hours with the exclusion of moisture. After cooling it was poured into 500 cc. H$_2$O. No quinoline-8-sulphonic acid crystallized out in this experiment. The only resultant products were quinoline-5-sulphonic acid and other water soluble quinoline mono-sulphonic acids.

In carrying out the prior art process under the identical conditions, 67 gms. of quinoline-8-sulphonic acid was obtained. Therefore, this illustrates the action of the mercury compound in suppressing the formation of the 8-isomer.

The present process has a number of advantages over the prior art without substantially changing the prior operation except for the addition of the catalyst, and a highly efficient operation which is quite selective has resulted. For the first time it has been made possible to obtain commercially from quinoline the quinoline-5-sulphonic acid at a cost permitting the use thereof in various industrial operations. One of the important features of the invention is that the product is entirely free from the 8-isomer. The process lends itself to a simple operation and no close control thereof is necessary.

Although the invention has been described setting forth a considerable number of examples, the invention is not limited to such examples, which are to be considered as illustrating the invention. Many changes in the details of the operation may be made within the spirit of the invention. For instance, sulphonation mixtures of different composition than stated above may also be used. It is not necessary to start with pure quinoline but an impure material may be used in the process with good results. The actual technique employed may be varied considerably in a number of conditions, including temperatures of and reaction, concentrations of reagents, time of operation and the like. Other mercury compounds than those specifically named herein may be used and the effectiveness thereof may be determined by simple tests. Also a change of the conditions of the sulphonation operation may be made to accommodate the various mercury compounds used as catalyst.

Larger or smaller quantities of mercury or the mercury compounds may be used in the reaction. When the smaller quantities are used, the suppression of the 8-isomer will not be complete. When quantities of larger than about .2% and up to 5% by weight based on the quinoline are used, excellent results are still obtained; but the excess of the catalyst is unnecessary in most cases. Therefore, the catalysts include mercury, such compounds thereof which are end products of the reaction with sulphuric acid, and such compounds which are capable of reacting with sulphuric acid at temperatures at which sulphonation takes place, such as 75° to 90° or higher.

While in the specific examples the quinoline was added to the sulphonating agent, this order of addition may be altered. For instance, the mixture of oleum and mercury or its compounds may be introduced into the quinoline, or the oleum may be added to a mixture of quinoline and the catalyst. The wording of the claims is intended to include various orders of addition of the materials used, as the end result in all cases is the same.

The speed of the reaction is dependent on the temperature used, the reaction being accelerated at the higher temperatures. If too high temperatures are used oxidation takes place. Therefore, the temperatures at which the reaction is caused to take place are below those at which a substantial amount of oxidation would occur, while still preventing the formation of quinoline-8-sulphonic acid.

These and other changes in the details of the process may be made within the scope of the invention, which is to be broadly construed and be limited only by the character of the claims appended hereto.

I claim:

1. A method of producing quinoline-5-sulphonic acid and other similarly soluble quinoline sulphonic acids which comprises adding to a sulphonation mixture a substance taken from the class consisting of mercury, its sulphates, and compounds thereof capable of reacting with sulphuric acid, the amount of said substance being sufficient to at least partially suppress the formation of quinoline-8-sulphonic acid, adding quinoline thereto, maintaining a sufficiently high temperature for a sufficient time to sulphonate said quinoline.

2. A method of producing quinoline-5-sulphonic acid and other similarly soluble quinoline sulphonic acids which comprises adding to a sulphonation mixture a substance taken from the class consisting of mercury, its sulphates, and compounds thereof capable of reacting with sulphuric acid, the amount of said substance being about 0.2% to 3.0% by weight based on the quinoline and being sufficient to at least partially suppress the formation of quinoline-8-sulphonic acid, adding quinoline thereto, maintaining a sufficiently high temperature for a sufficient time to sulphonate said quinoline.

3. A method of producing quinoline-5-sulphonic acid and other similarly soluble quinoline sulphonic acids which comprises adding to a sulphonation mixture a substance taken from the class consisting of mercury, its sulphates, and compounds thereof capable of reacting with sulphuric acid, the amount of said substance being sufficient to at least partially suppress the formation of quinoline-8-sulphonic acid, adding quinoline thereto, maintaining a temperature of about 75° C. to 175° C. for a sufficient time to sulphonate said quinoline.

4. A method of producing quinoline-5-sulphonic acid and other similarly soluble quinoline sulphonic acids which comprises adding to a sulphonation mixture a substance taken from the class consisting of mercury, its sulphates, and compounds thereof capable of reacting with sulphuric acid, the amount of said substance being sufficient to at least partially suppress the formation of quinoline-8-sulphonic acid, adding quinoline thereto, maintaining a sufficiently high temperature for a sufficient time to sulphonate said quinoline adding an aqueous solution of mercuric chloride to the sulphonation product to separate quinoline-5-sulphonic acid from said mixture.

5. A method of producing quinoline-5-sulphonic acid and other similarly soluble quinoline sulphonic acids which comprises adding to a sulphonation mixture of concentrated sulphuric acid containing an excess of $SO_3$, a substance taken from the class consisting of mercury, its sulphates and compounds thereof capable of reacting with sulphuric acid, the amount of said substance being at least .2%–2% by weight based on quinoline to be added, adding quinoline thereto to cause a reaction to take place raising the temperature to at least 90° C., and maintaining said temperature for a sufficient time to sulphonate said quinoline, the weight of quinoline introduced being less than the weight of said mixture.

6. A method of producing quinoline-5-sulphonic acid and other similarly soluble quinoline sulphonic acids which comprises adding to a sulphonation mixture of concentrated sulphuric acid containing an excess of $SO_3$, a substance taken from the class consisting of mercury, its sulphates and compounds thereof capable of reacting with sulphuric acid, the amount of said substance being at least .2%–2% by weight based on quinoline to be added, adding quinoline thereto to cause a reaction to take place raising the temperature to 90° C.–175° C., and maintaining said temperature for a sufficient time to sulphonate said quinoline, the weight of quinoline introduced being less than the weight of said mixture.

7. A method of producing quinoline-5-sulphonic acid and other similarly soluble quinoline sulphonic acids which comprises adding to a sulphonation mixture of concentrated sulphuric acid containing an excess of $SO_3$, a substance taken from the class consisting of mercury, its sulphates and compounds thereof capable of reacting with sulphuric acid, the amount of said substance being at least .2%–2% by weight based on quinoline to be added, adding quinoline thereto to cause a reaction to take place raising the temperature to at least 90° C., and maintaining said temperature for a sufficient time to sulphonate said quinoline, the weight of quinoline introduced being one-third to one-sixth the weight of said mixture.

8. A method of producing quinoline-5-sulphonic acid and other similarly soluble quinoline sulphonic acids which comprises adding to a sulphonation mixture of concentrated sulphuric acid containing an excess of $SO_3$, a substance taken from the class consisting of mercury, its sulphates and compounds thereof capable of reacting with sulphuric acid, the amount of said substance being at least .2%–2% by weight based on quinoline to be added, adding quinoline thereto to cause a reaction to take place raising the temperature to at least 90° C., and maintaining said temperature for a sufficient time to sulphonate said quinoline, said time being from 1 to 40 hours, the lesser times being at the higher temperatures and greater excess of $SO_3$, the weight of quinoline introduced being less than the weight of said mixture.

9. A method of producing quinoline-5-sulphonic acid and other similarly soluble quinoline sulphonic acids which comprises adding to a sulphonation mixture of concentrated sulphuric acid containing an excess of $SO_3$ in an amount of 18% to 65% of the sulphuric acid, a substance taken from the class consisting of mercury, its sulphates and compounds thereof capable of reacting with sulphuric acid, the amount of said substance being at least .2%–2% by weight based on quinoline to be added, adding quinoline thereto to cause a reaction to take place raising the temperature to at least 90° C., and maintaining said temperature for a sufficient time to sulphonate said quinoline, the weight of quinoline introduced being less than the weight of said mixture.

10. A method of producing quinoline-5-sulphonic acid and other similarly soluble quinoline sulphonic acids which comprises adding to a sulphonation mixture of concentrated sulphuric acid containing an excess of $SO_3$, a mercuric organic salt, the amount of said substance being at least .2%–2% by weight based on quinoline to be added, adding quinoline thereto to cause a reaction to take place raising the temperature to at least 90° C., and maintaining said temperature for a sufficient time to sulphonate said quinoline, the weight of quinoline introduced being less than the weight of said mixture.

11. A method of producing quinoline-5-sulphonic acid and other similarly soluble quinoline sulphonic acids which comprises adding to a sulphonation mixture of concentrated sulphuric acid containing an excess of $SO_3$, a mercuric inorganic salt taken from the class consisting of the sulphate and salts capable of reacting with sulphuric acid, the amount of said substance being at least .2%–2% by weight based on quinoline to be added, adding quinoline thereto to cause a reaction to take place raising the temperature to at least 90° C., and maintaining said temperature for a sufficient time to sulphonate said quinoline, the weight of quinoline introduced being less than the weight of said mixture.

12. A method of producing quinoline-5-sulphonic acid and other similarly soluble quinoline sulphonic acids which comprises adding to a sulphonation mixture of concentrated sulphuric acid containing an excess of $SO_3$, a mercurous salt, the amount of said substance being at least .2%–2% by weight based on quinoline to be added, adding quinoline thereto to cause a reaction to take place raising the temperature to at least 90° C., and maintaining said temperature for a sufficient time to sulphonate said quinoline, the weight of quinoline introduced being less than the weight of said mixture.

No references cited.